US012454120B2

(12) United States Patent
Baek et al.

(10) Patent No.: US 12,454,120 B2
(45) Date of Patent: Oct. 28, 2025

(54) POLYETHYLENE FILM HAVING MULTI-LAYER STRUCTURE AND PACKAGING MATERIAL PRODUCED USING THE SAME

(71) Applicants: SK Innovation Co., Ltd., Seoul (KR); SK Geo Centric Co., Ltd., Seoul (KR)

(72) Inventors: Eunjung Baek, Daejeon (KR); Soyoung Park, Daejeon (KR); Daesig Hong, Daejeon (KR); Joohyun Nam, Daejeon (KR); Jaemyoung Son, Daejeon (KR); Byoungcheon Jo, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/551,273

(22) PCT Filed: Jun. 7, 2022

(86) PCT No.: PCT/KR2022/007978
§ 371 (c)(1),
(2) Date: Sep. 19, 2023

(87) PCT Pub. No.: WO2022/260384
PCT Pub. Date: Dec. 15, 2022

(65) Prior Publication Data
US 2024/0157687 A1 May 16, 2024

(30) Foreign Application Priority Data

Jun. 10, 2021 (KR) ........................ 10-2021-0075620

(51) Int. Cl.
*B32B 27/08* (2006.01)
*B32B 7/02* (2019.01)
*B32B 27/32* (2006.01)
*B65D 65/40* (2006.01)
*C08F 110/02* (2006.01)

(52) U.S. Cl.
CPC .............. *B32B 27/08* (2013.01); *B32B 7/02* (2013.01); *B32B 27/32* (2013.01); *B65D 65/40* (2013.01); *C08F 110/02* (2013.01); *B32B 2250/03* (2013.01); *B32B 2250/04* (2013.01); *B32B 2250/05* (2013.01); *B32B 2255/10* (2013.01); *B32B 2255/28* (2013.01); *B32B 2307/31* (2013.01); *B32B 2307/558* (2013.01); *B32B 2307/72* (2013.01); *B32B 2307/7376* (2023.05); *B32B 2323/043* (2013.01); *B32B 2323/046* (2013.01); *B32B 2439/46* (2013.01); *B32B 2439/70* (2013.01); *B65D 2565/385* (2013.01); *B65D 2565/386* (2013.01)

(58) Field of Classification Search
CPC .... B23B 2250/03–05; B32B 2307/558; B32B 2307/72; B32B 7/02; B32B 27/32; B32B 2250/242; B32B 2307/31; B32B 2439/70; B32B 27/327; B32B 7/7376; B32B 2323/04–046
See application file for complete search history.

(56) References Cited

U.S. PATENT DOCUMENTS

| 5,019,315 A * | 5/1991 | Wilson ................. B32B 37/153 264/514 |
| 5,520,972 A * | 5/1996 | Ezaki .................... A61L 31/048 428/218 |
| 5,789,029 A | 8/1998 | Ramsey et al. |
| 2006/0177641 A1 * | 8/2006 | Breese ................... B32B 27/08 428/910 |
| 2006/0188678 A1 * | 8/2006 | Ohlsson ................. B32B 27/20 428/218 |

(Continued)

FOREIGN PATENT DOCUMENTS

| JP | 2001322214 A | 11/2001 |
| JP | 2003251697 A | 9/2003 |

(Continued)

OTHER PUBLICATIONS

Supreme 891 Polyolefin Plastomer—Technical Information Sheet, SK Global Chemical Co., Ltd., Apr. 17, 2017, accessed online Mar. 7, 2025, https://datasheets.acran.com.tr/GetTDS.ashx?file=POP%20-%20SK%20-%20SUPREME%20891%20[2195].pdf&id=2195&wm=true (Year: 2017).*

(Continued)

*Primary Examiner* — Michael C Romanowski
(74) *Attorney, Agent, or Firm* — The Webb Law Firm

(57) ABSTRACT

Provided is a polyethylene film having a multi-layer structure including an outer layer (A) including a first ethylene polymer having a density M1 of $0.935 \leq M1 \leq 0.968$; an intermediate layer (B) including a second ethylene polymer having a density M2 of $0.900 \leq M2 \leq 0.920$; and an inner layer (C) including a third ethylene polymer having a density M3 of $0.850 \leq M3 \leq 0.905$, wherein the outer layer (A), the intermediate layer (B), and the inner layer (C) are sequentially laminated to form the polyethylene film comprising the multi-layer structure, and wherein a falling ball impact strength per unit thickness and a puncture strength per unit thickness of the polyethylene film comprising the multi-layer structure are 3.0 to 15.0 g/μm and 0.2 to 0.4 N/μm, respectively, and a difference in melting point between the outer layer (A) and the inner layer (C) is 30 to 100° C.

15 Claims, No Drawings

(56) References Cited

U.S. PATENT DOCUMENTS

| | | | |
|---|---|---|---|
| 2009/0169862 A1* | 7/2009 | Rhee | H01M 50/489 264/171.23 |
| 2012/0014625 A1* | 1/2012 | Igarashi | B32B 27/327 428/218 |
| 2013/0164831 A1* | 6/2013 | Tanaka | B32B 1/00 428/218 |
| 2013/0167486 A1* | 7/2013 | Aarnio | B65B 5/02 428/218 |
| 2017/0121082 A1* | 5/2017 | Tiwari | B65D 75/566 |
| 2018/0370202 A1* | 12/2018 | Niedersüss | B32B 27/08 |
| 2019/0291395 A1* | 9/2019 | Baccaro | B32B 7/04 |
| 2019/0344532 A1* | 11/2019 | Baccaro | A01F 25/13 |
| 2019/0344548 A1* | 11/2019 | Scala | B32B 27/32 |
| 2019/0344551 A1* | 11/2019 | Grefenstein | B65D 65/40 |
| 2019/0366696 A1* | 12/2019 | Scala | C08L 23/06 |
| 2020/0079061 A1* | 3/2020 | Clare | B32B 27/34 |
| 2021/0339509 A1* | 11/2021 | Wang | C08L 23/10 |
| 2022/0288906 A1* | 9/2022 | Alaboson | C08L 23/06 |
| 2023/0131094 A1* | 4/2023 | Goh | B32B 27/306 428/213 |
| 2023/0242749 A1* | 8/2023 | Wang | B29C 48/10 428/215 |
| 2024/0092066 A1* | 3/2024 | Zalamea Bustillo | B32B 27/32 |
| 2024/0209164 A1* | 6/2024 | Wang | B32B 27/08 |

FOREIGN PATENT DOCUMENTS

| | | | |
|---|---|---|---|
| JP | 2004506049 A | | 2/2004 |
| JP | 2005144757 A | * | 6/2005 |
| JP | 2011025637 A | | 2/2011 |
| JP | 2020-037189 A | | 3/2020 |
| JP | 2020526412 A | | 8/2020 |
| JP | 6814287 B2 | | 1/2021 |
| KR | 100291452 B1 | | 9/2001 |
| KR | 102035790 B1 | | 10/2019 |
| KR | 1020200094579 A | | 8/2020 |
| KR | 102157101 B1 | * | 9/2020 |
| KR | 102261130 B1 | | 6/2021 |
| WO | 0198409 A1 | | 12/2001 |
| WO | 2021076552 A1 | | 4/2021 |

OTHER PUBLICATIONS

Solumer 861L Data Sheet, SK Innovation, Jul. 24, 2015, accessed online Mar. 7, 2025, http://www.dalmiapolymers.com/solumer-pdf/technical-datasheet_solumer-861L_v150724.pdf (Year: 2015).*

* cited by examiner

POLYETHYLENE FILM HAVING MULTI-LAYER STRUCTURE AND PACKAGING MATERIAL PRODUCED USING THE SAME

CROSS REFERENCE TO RELATED APPLICATIONS

This application is the United States national phase of International Patent Application No. PCT/KR2022/007978 filed Jun. 7, 2022, and claims priority to Korean Patent Application No. 10-2021-0075620 filed Jun. 10, 2021, the disclosures of each of which are hereby incorporated by reference in their entireties.

BACKGROUND OF THE INVENTION

Field of the Invention

The present invention relates to a polyethylene film having a multi-layer structure and a packaging material produced using the same.

Description of Related Art

Packaging materials have been mainly produced using a resin film formed of a resin material. Among them, a resin film formed of a polyolefin has been widely used as a packaging material because it has appropriate flexibility and excellent transparency.

The resin film formed of a polyolefin has been used by bonding resin films formed of polyester, polyamide, or the like that have more excellent mechanical properties and thermal properties, and the like, with a polyurethane-based adhesive, an acrylic adhesive, or the like. Accordingly, a common packaging material includes a laminated film in which a substrate and a heat-seal layer are formed of different materials. Therefore, it is difficult to separate the different types of the resin materials of the packaging material according to the related art, and recycling is practically impossible, which has become a serious social problem in terms of the environment.

In order to solve the problem, a technology for implementing a recyclable packaging material, in particular, a technology for implementing a packaging material using a resin film formed of only a polyolefin-based single material has been continuously developed. However, as described above, since mechanical properties of the polyolefin resin are inferior to those of a resin used as a substrate according to the related art, durability of a packaging material to be formed is deteriorated, such that defects are likely to occur in a printing process of the packaging material and the packaging material is easily damaged during use, such as when transported or stored. In addition, since heat resistance of the polyolefin resin is inferior to that of the resin used as a substrate according to the related art, defects are likely to occur in a heat-sealing process for forming a packaging material, such that heat-sealing properties may be deteriorated.

Therefore, a film having a multi-layer structure in which polyolefin resins having mechanical and thermal properties that are different from each other based on a density, an additive, a composition ratio, and the like, in spite of using only a polyolefin-based single material, are laminated has been continuously developed. However, it is still difficult to obtain excellent mechanical and thermal properties, commercialization is not easy in terms of cost, and in particular, there is a limit to realizing a packaging material that may be used even at a low temperature, such that improvement is required.

For example, Japanese Patent Laid-Open Publication No. 2020-037189 discloses a laminated film for a packaging material in which a content of a polyolefin is 80 parts by weight or more with respect to the entire film, but there is still a problem in that durability at a low temperature is deteriorated. Japanese Patent No. 6814287 discloses a recyclable polyethylene single material laminated film, but it is still difficult to obtain excellent heat resistance and heat-sealing properties are deteriorated.

Therefore, developments of a novel film that may be easily recycled to solve environmental problems because it is a resin film formed of only a single material, has mechanical and thermal properties that are not significantly deteriorated in comparison to those of a laminated film formed of different materials according to the related art, may be commercialized by maintaining excellent physical properties in various temperature ranges, and also has excellent processability, and a packaging material have been demanded.

In particular, in a case where a packaging material formed of a polyethylene film having a multi-layer structure is used at a low-temperature condition, when an impact is applied due to vibration, dropping, and the like, leakage of contents to the outside frequently occurs due to cracks, tears, holes, or scratches generated in a surface area of the film. In addition, damage to the film caused by a high-temperature sealing process during heat-sealing of the film and a rupture phenomenon due to an impact applied to a heat-sealed boundary area at a low-temperature condition also frequently occur. Therefore, in order to prevent such problems, it is required for the polyethylene film having a multi-layer structure essentially to have low-temperature durability.

In general, in the related art, the durability of the film is determined from a falling ball impact strength in the surface area of the film. However, the present inventors have found that in the case of the polyethylene film having a multi-layer structure, a falling ball impact strength and a puncture strength tend to be inversely proportional to each other, and have discovered that when both physical properties satisfy specific ranges of values in consideration of not only the falling ball impact strength but also the puncture strength, low-temperature durability of the film may be significantly improved, thereby completing the present invention.

RELATED ART DOCUMENTS

Patent Documents (Patent Document 1) Japanese Patent Laid-Open Publication No. 2020-037189 (Mar. 12, 2020)
(Patent Document 2) Japanese Patent No. 6814287 (Dec. 22, 2020)

SUMMARY OF THE INVENTION

Technical Problem

An object of the present invention is to provide a polyethylene film comprising a multi-layer structure and a packaging material produced using the same that do not cause environmental pollution because they are recyclable and may minimize damage during processing and commercialization processes because mechanical properties and thermal properties are not significantly deteriorated in comparison to those of an existing laminated film formed of different materials and a packaging material produced using the same.

Another object of the present invention is to provide a polyethylene film comprising a multi-layer structure that is suitably used for a molded article used in a low-temperature state, such as an ice pack, a frozen food packaging bag, a frozen food container, a refrigerated food packaging bag, or a refrigerated food container because a falling ball impact strength and a puncture strength are excellent in balance and thus the two mechanical properties simultaneously satisfy specific numerical ranges and durability at a low temperature is excellent, and a packaging material produced using the same.

Still another object of the present invention is to provide a polyethylene film comprising a multi-layer structure that implements significantly excellent heat-sealing properties and high-speed bag-making processability of the film even in a low temperature range in which the film is not damaged or physical properties thereof are not deteriorated, and a packaging material produced using the same.

Technical Solution

In one general aspect, A polyethylene film comprising a multi-layer structure, comprising:
an outer layer (A) comprising a first ethylene polymer having a density $M_1$ of $0.935 \leq M_1 \leq 0.968$;
an intermediate layer (B) comprising a second ethylene polymer having a density $M_2$ of $0.900 \leq M_2 \leq 0.920$; and
an inner layer (C) comprising a third ethylene polymer having a density $M_3$ of $0.850 \leq M_3 \leq 0.905$,
each density being measured according to ASTM D-792, and a unit of each density is $g/cm^3$,
wherein the outer layer (A), the intermediate layer (B), and the inner layer (C) are sequentially laminated to form the polyethylene film comprising the multi-layer structure, and
wherein a falling ball impact strength per unit thickness and a puncture strength per unit thickness of the polyethylene film comprising the multi-layer structure are 3.0 to 15.0 g/μm and 0.2 to 0.4 N/μm, respectively, and a difference in melting point between the outer layer (A) and the inner layer (C) is 30 to 100° C.

In an exemplary embodiment of the present invention, a ratio of thicknesses of the outer layer (A), the intermediate layer (B), and the inner layer (C) may be 1:1 to 10:0.5 to 2.

In an exemplary embodiment of the present invention, the melting point of the inner layer (C) may be 80° C. or lower.

In an exemplary embodiment of the present invention, a heat-sealing initiation temperature that is a temperature when the inner layer (C) is heat-sealed according to ASTM F2029 and a seal strength measured according to ASTM F88 is 1,000 gf or more may be 40 to 120° C.

In an exemplary embodiment of the present invention, a melt index of each of the first ethylene polymer, the second ethylene polymer, and the third ethylene polymer may be 0.5 to 5 g/10 min when measured at 190° C. and 2.16 kg according to ASTM D 1238.

In an exemplary embodiment of the present invention, a molecular weight distribution of the first ethylene polymer may be 3 to 10, and a molecular weight distribution of the second ethylene polymer and the third ethylene polymer may be 1 to 5.

In an exemplary embodiment of the present invention, the falling ball impact strength per unit thickness may be 5.0 to 13.0 g/μm.

In an exemplary embodiment of the present invention, the puncture strength per unit thickness may be 0.25 to 0.35 N/μm.

In an exemplary embodiment of the present invention, the difference in melting point between the outer layer (A) and the inner layer (C) may be 50 to 90° C.

In an exemplary embodiment of the present invention, a total thickness of the polyethylene film having a multi-layer structure may be 50 to 300 μm.

In an exemplary embodiment of the present invention, the first ethylene polymer, the second ethylene polymer, and the third ethylene polymer may be ethylene copolymers obtained by polymerizing ethylene and C3-C18 α-olefin comonomers.

In an exemplary embodiment of the present invention, the α-olefin comonomer may be one or a mixture of two or more selected from 1-propylene, 1-butene, 1-hexene, 1-heptene, and/or 1-octene.

In an exemplary embodiment of the present invention, one or more selected from the first ethylene polymer, the second ethylene polymer, and/or the third ethylene polymer may be polymerized in the presence of a single-site catalyst.

In an exemplary embodiment of the present invention, a functional layer may be laminated on the outer layer (A).

In an exemplary embodiment of the present invention, the functional layer may comprise one or two or more selected from a barrier coating layer, a top coating layer, and/or a print layer.

In another general aspect, there is provided a packaging material produced using the polyethylene film comprising a multi-layer structure.

In still another general aspect, there is provided a molded article comprising the packaging material.

In an exemplary embodiment of the present invention, the molded article may be any one selected from an ice pack, a frozen food packaging bag, a frozen food container, a refrigerated food packaging bag, a refrigerated food container, a shrink film, a heavy weight packaging film, an automatic packaging film, a stretch wrap, and/or a bag.

Also provided is A method for reducing environmental pollution from a multi-layered polyethylene film packaging material, comprising: preparing a recyclable polyethylene film comprising a multi-layer structure, comprising: an outer layer (A) comprising a first ethylene polymer having a density $M_1$ of $0.935 \leq M_1 \leq 0.968$; an intermediate layer (B) comprising a second ethylene polymer having a density $M_2$ of $0.900 \leq M_2 \leq 0.920$; and an inner layer (C) comprising a third ethylene polymer having a density $M_3$ of $0.850 \leq M_3 \leq 0.905$, each density being measured according to ASTM D-792, and a unit of each density is $g/cm^3$, and wherein the outer layer (A), the intermediate layer (B), and the inner layer (C) are sequentially laminated to form the polyethylene film comprising the multi-layer structure, and wherein a falling ball impact strength per unit thickness and a puncture strength per unit thickness of the polyethylene film comprising the multi-layer structure are 3.0 to 15.0 g/μm and 0.2 to 0.4 N/μm, respectively, and a difference in melting point between the outer layer (A) and the inner layer (C) is 30 to 100° C.

Advantageous Effects

An aspect of the present invention is to provide a polyethylene film comprising a multi-layer structure and a packaging material produced using the same, and the packaging material is recyclable and does not cause environmental pollution since it is produced using a film formed of a polyethylene single material.

Further, in the polyethylene film comprising a multi-layer structure and the packaging material produced using the same according to an aspect of the present invention, mechanical properties and thermal properties are not significantly deteriorated in comparison to those of an existing laminated film formed of different materials and a packaging material produced using the same, such that damage may be minimized during processing and commercialization processes.

Further, in the polyethylene film comprising a multi-layer structure and the packaging material produced using the same according to an aspect of the present invention, since a falling ball impact strength and a puncture strength are excellent in balance, the two mechanical properties simultaneously satisfy specific numerical ranges and durability at a low temperature is excellent, such that the polyethylene film and the packaging material may be suitably used for a molded article used in a low-temperature state, such as an ice pack, a frozen food packaging bag, a frozen food container, a refrigerated food packaging bag, or a refrigerated food container.

Further, the polyethylene film comprising a multi-layer structure according to an aspect of the present invention may have significantly excellent heat-sealing properties and high-speed bag-making processability even in a low temperature range in which the film is not damaged or physical properties thereof are not deteriorated.

BEST MODE

Hereinafter, a polyethylene film comprising a multi-layer structure and a packaging material produced using the same according to the present invention will be described in detail.

Here, unless otherwise defined, all the technical terms and scientific terms have the same meanings as commonly understood by those skilled in the art to which the present invention pertains. The terms used in the description of the present invention are merely used to effectively describe a specific exemplary embodiment, but are not intended to limit the present invention.

In addition, unless otherwise stated in the specification, a unit of an additive may be wt %.

In addition, unless the context clearly indicates otherwise, the singular forms used in the specification and the scope of the appended claims are intended to include the plural forms.

Hereinafter, unless otherwise particularly defined in the present specification, the term "polymer" may refer to a polymerizable compound produced by polymerizing monomers. Specifically, the polymer may comprise a homopolymer, a copolymer, a terpolymer, an interpolymer, and the like. The interpolymer may refer to a polymer produced by polymerizing two or more different monomers. Therefore, the generic term "interpolymer" may comprise a copolymer and a terpolymer. The copolymer refers to a polymer produced from two different monomers, and the terpolymer refers to a polymer produced from three different monomers.

Hereinafter, unless otherwise specifically defined in the present specification, it will be understood that when an element such as a layer, a film, a thin film, a region, or a plate, is referred to as being "above" or "on" another element, it may be "directly on" another element or may have an intervening element present therebetween.

An exemplary embodiment of the present invention may provide a polyethylene film comprising a multi-layer structure that is suitably used for a molded article used in a low-temperature state, such as an ice pack, a frozen food packaging bag, a frozen food container, a refrigerated food packaging bag, or a refrigerated food container because it is recyclable and does not cause environmental pollution since it is formed using a polyethylene single material, may minimize damage during processing and commercialization processes since mechanical properties and thermal properties are not significantly deteriorated in comparison to those of an existing laminated film formed of different materials and a packaging material produced using the same, in particular, has excellent durabilities in a surface area and a heat-sealed boundary area at a low temperature, and has significantly improved high-speed bag-making processability due to excellent heat-sealing properties at a low temperature, and a packaging material produced using the same.

The present invention will be described in detail as follows.

A polyethylene film comprising a multi-layer structure according to an aspect of the present invention may comprise: an outer layer (A) comprising a first ethylene polymer; an intermediate layer (B) comprising a second ethylene polymer; and an inner layer (C) comprising a third ethylene polymer, (A), (B), and (C) being sequentially laminated.

In the case, the polyethylene film comprising a multi-layer structure according to an aspect of the present invention may simultaneously satisfy physical properties in which the first ethylene polymer, the second ethylene polymer, and the third ethylene polymer satisfy the following Expressions 1 to 3, a falling ball impact strength per unit thickness and a puncture strength per unit thickness of the polyethylene film comprising a multi-layer structure are 3.0 to 15.0 g/μm and 0.2 to 0.4 N/μm, respectively, and a difference in melting point between the outer layer (A) and the inner layer (C) is 30 to 100° C.

$$0.935 \leq M1 \leq 0.968 \quad \text{[Expression 1]}$$

$$0.900 \leq M2 \leq 0.920 \quad \text{[Expression 2]}$$

$$0.850 \leq M3 \leq 0.905 \quad \text{[Expression 3]}$$

In the Expressions 1 to 3, the M1 is a density of the first ethylene polymer, the M2 is a density of the second ethylene polymer, the M3 is a density of the third ethylene polymer, the density is measured according to ASTM D-792, and a unit of the density is g/cm$^3$ In an aspect of the present invention, more specifically, a density of the first ethylene polymer may be 0.950 to 0.968 g/cm3 and more preferably 0.955 to 0.965 g/cm3, a density of the second ethylene polymer may be 0.905 to 0.920 g/cm3 and more preferably 0.910 to 0.920 g/cm3, and a density of the third ethylene polymer may be 0.860 to 0.905 g/cm3 and more preferably 0.860 to 0.890 g/cm3, but the present invention is not limited thereto.

In an aspect of the present invention, more specifically, the falling ball impact strength per unit thickness of the polyethylene film comprising a multi-layer structure may be 5.0 to 13.0 g/μm, preferably 8.0 to 13.0 g/μm, and more preferably 10.0 to 13.0 g/μm, and the puncture strength per unit thickness of the polyethylene film comprising a multi-layer structure may be 0.25 to 0.35 N/μm, preferably 0.25 to 0.30 N/μm, and more preferably 0.27 to 0.30 N/μm, but the present invention is not limited thereto.

In this case, a falling ball impact strength refers to a value measured according to ASTM D 1709, a puncture strength refers to a value obtained by measuring a maximum strength when the film is ruptured by a pin having a diameter of 6.5 mm that punctures the film in an inner surface direction at a speed of 500 mm/min, and the falling ball impact strength and the puncture strength per unit thickness refer to numerical values obtained by dividing the falling ball impact strength and puncture strength values measured according to the above methods by the total thickness of the film, respectively.

In the cases of the polyethylene film comprising a multi-layer structure comprising the outer layer (A) comprising the first ethylene polymer, the intermediate layer (B) comprising the second ethylene polymer, and the inner layer (C) comprising the third ethylene polymer, (A), (B), and (C) being sequentially laminated, and the packaging material produced using the same that satisfy the above physical properties, the polyethylene film and the packaging material are easily recycled because they are formed of a polyethylene single material, and mechanical properties such as impact resistance and a tensile strength are not deteriorated in comparison to those of a laminated film formed of different materials according to the related art, such that defects occurring in a printing process are unlikely to occur due to excellent printing processability, durability, and the like, and the packaging material is not easily damaged during use, such as when transported or stored, and thus may be easily commercialized.

In particular, since physical properties such as durability in the surface area of the film and cracking strength in the heat-sealed boundary area in a low-temperature state are significantly excellent, the polyethylene film and the packaging material are significantly useful in various temperature ranges including a low temperature.

In addition, any ethylene polymer satisfying the above physical properties may be used regardless of its type, and thus, it is possible to minimize an influence of a type of a functional group contained in the ethylene polymer, a molecular structure of the ethylene polymer, and the like, and a polyethylene film comprising a multi-layer structure having excellent physical properties desired in the present invention may be sufficiently obtained even when an ethylene polymer product of an inexpensive price that is easier to commercialize is used, such that versatility may be significantly improved.

In particular, the polyethylene film comprising a multi-layer structure and the packaging material produced using the same that have a falling ball impact strength and a puncture strength per unit thickness simultaneously satisfying the above ranges may have excellent mechanical and thermal properties, and physical properties such as durability in the surface area of the film and cracking strength in the heat-sealed boundary area are significantly excellent even in a low-temperature state, such that the polyethylene film and the packaging material are significantly useful in various temperature ranges including a low temperature. Therefore, the polyethylene film and the packaging material may be significantly suitably used for a molded article produced at a high temperature or room temperature and distributed and used in a low-temperature state, such as an ice pack, a frozen food packaging bag, a frozen food container, a refrigerated food packaging bag, or a refrigerated food container, such that their application ranges may be significantly expanded.

More specifically, in order to evaluate a degree of durability in the heat-sealed boundary area at a low temperature of the packaging material produced using the polyethylene film comprising a multi-layer structure according to an aspect of the present invention, inner layers of the polyethylene film comprising a multi-layer structure are folded and fixed to face each other and heat-sealed at 0.2 MPa with a heating bar at 125° C. for 1 second, a weight having a weight of 5.381 kg and a diameter of 20 mm is dropped at a speed of 4.3 km/s to a heat-sealed area of the film stored at a chamber at −20° C. for 1 hour or longer, and an energy value when the heat-sealed boundary area is ruptured is measured.

As a result, although not limited thereto, the measured energy value of the polyethylene film comprising a multi-layer structure according to an aspect of the present invention is 1.0 J or more, preferably 1.5 J or more, and more preferably 1.6 J or more, and it is confirmed that the heat-sealed boundary area is ruptured only when a significantly high energy impact is applied, which shows that durability in the heat-sealed boundary area at a low temperature is significantly excellent.

In addition, it is confirmed that even when 10 ice pack samples obtained by filling 500 ml of water in packaging material samples having a width of 150 mm and a length of 240 mm and prepared from the polyethylene film comprising a multi-layer structure according to an aspect of the present invention and leaving the packaging material samples at −5° C. for 24 hours are put in a box and the box is dropped from a height of 1 m, damage of the sample, such as cracking or tearing, does not occur at all, and even when the sample is left at room temperature for a long time after dropping, the inside water does not leak to the outside, which shows that durability of the film at a low temperature is also significantly excellent.

Accordingly, the fact that in the case of the polyethylene film comprising a multi-layer structure and the packaging material produced using the same according to the present invention, all physical properties such as durability in the surface area of the film and cracking strength in the heat-sealed boundary area at a low temperature are significantly excellent is confirmed through a specific experiment. As described above, the polyethylene film and the packaging material may be significantly suitably used for a molded article produced at a high temperature or room temperature and distributed and used in a low-temperature state, such as an ice pack, a frozen food packaging bag, a frozen food container, a refrigerated food packaging bag, or a refrigerated food container, such that their application ranges may be significantly expanded.

In an aspect of the present invention, more specifically, the difference in melting point between the outer layer (A) and the inner layer (C) may be 50 to 90° C. and preferably 55 to 90° C., but is not limited thereto.

When the difference in melting point between the outer layer (A) and the inner layer (C) satisfies the above range, the polyethylene film comprising a multi-layer structure according to an aspect of the present invention may be subjected to a heat-sealing process even in a sufficiently low temperature range in which the outer layer (A) and the intermediate layer (B) are not damaged or physical properties thereof are not deteriorated, and even when the outer layer (A) and the intermediate layer (B) have a relatively low melting point in comparison to polyester, polyamide, or the like, which is mainly used in a laminated film formed of different materials according to the related art, the film is not damaged or physical properties thereof are not deteriorated, and excellent heat-sealing properties and high-speed bag-making processability of the film may be implemented.

In particular, in a case where the high-speed bag-making processability is deteriorated, this leads to an increase in unit price of the packaging material to be produced, and thus, productivity and cost-effectiveness of the film and the packaging material are significantly deteriorated. In the polyethylene film comprising a multi-layer structure according to an aspect of the present invention, it is possible to improve the bag-making processability of the film and to obtain the cost-effectiveness accordingly by maintaining a large difference in melting point between the outer layer (A) and the inner layer (C).

In addition, in an aspect of the present invention, the melting point of the inner layer (C) may be 80° C. or lower and preferably 75° C. or lower, and more specifically, may be 40 to 80° C. and preferably 40 to 75° C., but is not limited thereto.

In addition, in an aspect of the present invention, a heat-sealing initiation temperature for heat-sealing the inner layer (C) may be 40 to 120° C., preferably 50 to 110° C., and more preferably 50 to 100° C., but is not limited thereto.

In this case, the heat-sealing initiation temperature refers to a temperature when a seal strength of the inner layer (C) is 1,000 gf or more when measured according to ASTM F2029 and ASTM F88.

When the melting point and the heat-sealing initiation temperature of the inner layer (C) satisfy the above ranges, in the polyethylene film comprising a multi-layer structure and the packaging material produced using the same according to the present invention, heat-sealing properties and high-speed bag-making processability of the film may be more significantly implemented even in a sufficiently low temperature range in which the outer layer (A) and the intermediate layer (B) of the film are not damaged or deterioration of physical properties thereof does not occur.

In an aspect of the present invention, a ratio of thicknesses of the outer layer (A), the intermediate layer (B), and the inner layer (C) may be 1:1 to 10:0.5 to 2. In this case, the ratio of the thicknesses of the outer layer (A), the intermediate layer (B), and the inner layer (C) may be preferably 1:1 to 8:0.5 to 1 and more preferably 1:4 to 8:0.5 to 1, but is not limited thereto.

When the thickness of each layer satisfies the above ratio range, the balanced and excellent falling ball impact strength and puncture strength per unit thickness may be more significantly implemented, and durability at a low temperature may be further improved.

In addition, in an aspect of the present invention, a tensile strength of the polyethylene film comprising a multi-layer structure may be 350 kg/cm2 or more and preferably 380 kg/cm2 or more, but is not limited thereto. When the tensile strength satisfies the above range, the polyethylene film comprising a multi-layer structure according to an aspect of the present invention may have more excellent mechanical properties, and damage to the film may be further minimized in a commercialization process.

In an aspect of the present invention, a melt index of each of the first ethylene polymer, the second ethylene polymer, and the third ethylene polymer may be 0.5 to 5 g/10 min. In this case, the melt index of each of the first ethylene polymer, the second ethylene polymer, and the third ethylene polymer may be preferably 0.5 to 3 g/10 min and more preferably 0.5 to 1 g/10 min, but is not limited thereto. In this case, the melt index refers to a value measured at 190° C. and 2.16 kg according to ASTM D 1238.

In addition, in an aspect of the present invention, a molecular weight distribution of the first ethylene polymer may be 3 to 10 and preferably 5 to 9, and a molecular weight distribution of the second ethylene polymer and the third ethylene polymer may be 1 to 5 and preferably 2 to 4, but are not limited thereto.

When the first ethylene polymer, the second ethylene polymer, and the third ethylene polymer satisfy the above melt index and molecular weight distribution ranges, processability and mechanical properties of the polyethylene film comprising a multi-layer structure according to an aspect of the present invention may be further improved.

In an aspect of the present invention, a total thickness of the polyethylene film comprising a multi-layer structure may be 50 to 300 μm. In this case, the total thickness of the polyethylene film comprising a multi-layer structure may be preferably 100 to 200 μm and more preferably 120 to 150 μm, but is not limited thereto. When the total thickness satisfies the above range, durability of the polyethylene film comprising a multi-layer structure according to an aspect of the present invention may be further improved.

In an aspect of the present invention, the first ethylene polymer, the second ethylene polymer, and the third ethylene polymer may be ethylene copolymers obtained by polymerizing ethylene and C3-C18 α-olefin comonomers.

Specifically, the α-olefin comonomer may be one or a mixture of two or more selected from propylene, 1-butene, 1-pentene, 4-methyl-1-pentene, 1-hexene, 1-octene, 1-decene, 1-dodecene, 1-tetradecene, 1-hexadecene, and/or 1-octadecene, and more specifically, it is more preferable that the α-olefin comonomer is one or a mixture of two or more selected from 1-propylene, 1-butene, 1-hexene, 1-heptene, and/or 1-octene in terms of achieving the effects according to the present invention, but the present invention is not limited thereto. An ethylene copolymer having a high molecular weight may be produced while imparting fluidity to an ethylene homopolymer through the use of the α-olefin comonomer, and thus, the polyethylene film comprising a multi-layer structure comprising the ethylene copolymer may have further improved mechanical physical properties such as impact resistance and a tensile strength.

In an aspect of the present invention, a content of the α-olefin comonomer contained in 100 parts by weight of the ethylene copolymer may be 1 to 40 parts by weight, preferably 1 to 30 parts by weight, and more preferably 1 to 20 parts by weight, but is not limited thereto. When the content of the α-olefin comonomer satisfies the above range, rigidity and impact resistance of the ethylene polymer may be further improved, and the polyethylene film may be more easily applied alone to a molded article such as a film, injection molding, a compound, a sheet, and blow molding.

In an aspect of the present invention, the first ethylene polymer, the second ethylene polymer, and the third ethylene polymer may be obtained by appropriately selecting a polymerization method. For example, the polymerization may be performed by single polymerization by any one selected from gas phase polymerization, slurry polymerization, solution polymerization, and high pressure ion polymerization, or a multi-stage polymerization by a combination thereof using, as a polymerization catalyst, a multi-site catalyst such as a Ziegler-Natta catalyst or a single-site catalyst such as a metallocene catalyst, but this is a non-limited example, and the present invention is not limited thereto.

The single-site catalyst is a catalyst capable of forming a homogeneous active species, and in general, the single-site catalyst is obtained by bringing any one compound selected from a metallocene-based transition metal compound and a non-metallocene-based transition metal compound into contact with a cocatalyst for activation.

In this case, the single-site catalyst has a uniform active site structure in comparison to a multi-site catalyst, such that a polymer having a high molecular weight and high uniformity may be polymerized. Therefore, polymerization using a single-site catalyst is preferable, and polymerization using a metallocene-based catalyst among the single-site catalysts is more preferable, but the present invention is not limited thereto.

In particular, it is more preferable that one or more selected from the first ethylene polymer, the second ethylene polymer, and the third ethylene polymer is formed by polymerization using a metallocene-based catalyst in terms of achieving the effects according to the present invention, but the present invention is not limited thereto.

A method of producing a polyethylene film comprising a multi-layer structure according to an aspect of the present invention using the first ethylene polymer, the second ethylene polymer, and the third ethylene polymer is not limited as long as it may achieve the effects to be obtained by the present invention. Examples thereof comprise an injection molding method, an extrusion molding method, an inflation method, a T-die method, a calendar method, a blow molding method, a vacuum molding method, and an air pressure molding method. It is more preferable to use an inflation method in terms of achieving the effects according to the present invention, but it is a non-limiting example, and the present invention is not limited thereto.

In this case, the multi-layer structure may be implemented by one or two or more laminations and may be implemented by co-extrusion using a plurality of extruders, but the present invention is not limited thereto. In this case, in the co-extrusion, various physical properties of the film may be more significantly implemented by controlling the number of extruders.

In an aspect of the present invention, a functional layer may be additionally laminated on the outer layer (A).

In this case, the functional layer may comprise one or two or more selected from a barrier coating layer, a top coating layer, and/or a print layer, and more specifically, may comprise a print layer, an aluminum deposition layer, an oxygen barrier layer, an impact-resistant reinforcing layer, a heat-resistant reinforcing layer, and/or the like. Specifically, the oxygen barrier layer may be formed of ethylene vinyl alcohol (EVOH) or the like, and the impact-resistant reinforcing layer may be formed of polyamide (PA), polyester, or the like, but the present invention is not limited thereto.

Another aspect of the present invention provides a packaging material produced using the polyethylene film comprising a multi-layer structure and a molded article comprising the same. In this case, examples of the molded article comprise an ice pack, a frozen food packaging bag, a frozen food container, a refrigerated food packaging bag, a refrigerated food container, a shrink film, a heavy weight packaging film, an automatic packaging film, a stretch wrap, and/or a bag. The packaging material according to an aspect of the present invention may maintain excellent durability and mechanical properties in a wide temperature range including a low temperature in spite of continuous temperature change in a production process at room temperature, a heat-sealing process at a high temperature, and distribution and storage processes at a low temperature. Therefore, it is more preferable that the packaging material is applied to a molded article used at a low temperature, such as an ice pack, a frozen food packaging bag, a frozen food container, a refrigerated food packaging bag, or a refrigerated food container, in consideration of the effects according to the present invention, but it is a non-limiting example, and the present invention is not limited thereto.

Hereinafter, the present invention will be described in more detail with reference to Examples and Comparative Examples. However, the following Examples and Comparative Examples are only examples for describing the present invention in more detail, and the present invention is not limited by the following Examples and Comparative Examples.

Physical Property Measurement Methods (1) Density

A density was measured according to ASTM D 792.

(2) Melt Index

A melt index was measured at 190° C. and 2.16 kg according to ASTM D 1238.

(3) Falling Ball Impact Strength

A falling ball impact strength was measured according to ASTM D 1709.

(4) Puncture Strength

While a pin having a diameter of 6.5 mm punctured a film in an inner surface direction at a speed of 500 mm/min, a maximum strength when the film was ruptured was measured.

(5) Tensile Strength

A tensile strength was measured according to ASTM D 882. A unit of the tensile strength is kg/cm2.

(6) Heat-Sealing Properties

A heat-seal strength was measured according to ASTM F2029 and ASTM F88. A heat-sealing initiation temperature was based on a seal strength of 1,000 gf or more.

(7) Low-Temperature Cracking Strength in Heat-Sealed Boundary Area

As an index of durability in a heat-sealed area of a packaging material at a low temperature, a total energy value required when the corresponding area was ruptured by applying an impact to the heat-sealed area of the packaging material at a low temperature was evaluated. Both inner surfaces of the film were heat-sealed at 0.2 MPa with a heating bar at 125° C. for 1 second, a weight having a weight of 5.381 kg and a diameter of 20 mm was dropped at a speed of 4.3 km/s to a heat-sealed boundary area of the film stored at a chamber at −20° C. for 1 hour or longer, and an energy value required when the heat-sealed boundary area was ruptured was measured.

(8) Low-Temperature Packaging Drop Evaluation

As an index of the durability of the packaging material at a low temperature, a degree of damage according to dropping of the packaging material at a low temperature was evaluated. 10 ice pack samples obtained by filling 500 ml of water in packaging material samples having a width of 150 mm and a length of 240 mm and prepared from the film and leaving the packaging material samples at −5° C. for 24 hours were put in a box and the box was dropped from a height of 1 m, a degree of damage and whether the inside water leaked to the outside when the box was sufficiently left at room temperature were visually observed, and durability was evaluated based on evaluation criteria shown in Table 1.

TABLE 1

| Classification | ⊚ (Excellent) | ○ (Good) | X (Poor) |
|---|---|---|---|
| Degree of damage of sample | All 10 samples were not damaged and there was no leakage of water at room temperature | Scratches were observed in appearance, but there was no leakage of water at room temperature | Cracking or tearing was observed in one or more samples, and there was leakage of water at room temperature |

(9) Bag-Making Speed

A bag-making speed is an index of productivity of making bags through heat-sealing processing, and represents the number of bags produced that may be reached when heat-sealing conditions are optimized.

Example 1

A first ethylene polymer [density: 0.957 g/cm3, melting point: 131° C., melt index: 1.0 g/10 min (190° C., 2.16 kg), YUZEX 7302, SKGC] was used as a resin for an outer layer (A), a second ethylene polymer [density: 0.912 g/cm3, melting point: 111° C., MI: 1.0 g/10 min (190° C., 2.16 kg), Smart 121S, SKGC] was used as a resin for an intermediate layer (B), and a third ethylene polymer [density: 0.885 g/cm3, melting point: 74° C., MI: 1.0 g/10 min (190° C., 2.16 kg), Supreme 891, SKGC] was used as a resin for an inner layer (C). At this time, a polyethylene film comprising a multi-layer structure comprising three layers (A)/(B)/(C) was formed by co-extruding the resin by blown film molding while controlling the processing temperature for each layer from 165° C. to 195° C. using a total of three extruders having a screw size of 24 pi while performing filtering so that unmelted resin did not pass through the extruders. At this time, a die diameter was set to 50 mm, a die gap was set to 0.7 mm, a bubble expansion ratio at the time of production of the film was set to 2.6:1, and a height of a cooling wire cooled by air was set to 12 cm based on the die. The cooled and solidified film was pulled by a nip roller and wound into a film roll. Thicknesses and the total thickness of the layers of the film were 30 μm/60 μm/30 μm (total 120 μm).

The physical properties of the obtained polyethylene film are shown in Table 2.

Example 2

A polyethylene film having a multi-layer structure was produced in the same manner as that of Example 1, except that a first ethylene polymer [density: 0.965 g/cm3, melting point: 133° C., melt index: 1.0 g/10 min (190° C., 2.16 kg), YUZEX 7300, SKGC] was used as a resin for an outer layer (A), a second ethylene polymer [density: 0.918 g/cm3, melting point: 115° C., MI: 1.0 g/10 min (190° C., 2.16 kg), Smart 181S, SKGC] was used as a resin for an intermediate layer (B), a third ethylene polymer [density: 0.885 g/cm3, melting point: 74° C., MI: 1.0 g/10 min (190° C., 2.16 kg), Supreme 891, SKGC] was used as a resin for an inner layer (C), and the thicknesses and the total thickness of the layers of the film were 12 μm/96 μm/12 μm (total 120 μm) in Example 1.

The physical properties of the obtained polyethylene film are shown in Table 2.

Example 3

A polyethylene film having a multi-layer structure was produced in the same manner as that of Example 1, except that a first ethylene polymer [density: 0.963 g/cm3, melting point: 132° C., melt index: 0.7 g/10 min (190° C., 2.16 kg), YUZEX 8300, SKGC] was used as a resin for an outer layer (A), a second ethylene polymer [density: 0.919 g/cm3, melting point: 124° C., MI: 0.9 g/10 min (190° C., 2.16 kg), YUCLAIR FN810, SKGC] was used as a resin for an intermediate layer (B), a third ethylene polymer [density: 0.863 g/cm3, melting point: 45° C., MI: 1.0 g/10 min (190° C., 2.16 kg), Solumer 861, SKGC] was used as a resin for an inner layer (C), and the thicknesses and the total thickness of the layers of the film were 16 μm/63 μm/31 μm (total 100 μm) in Example 1.

The physical properties of the obtained polyethylene film are shown in Table 2.

Comparative Example 1

A polyethylene film having a multi-layer structure was produced in the same manner as that of Example 1, except that a first ethylene polymer [density: 0.965 g/cm3, melting point: 133° C., melt index: 1.0 g/10 min (190° C., 2.16 kg), YUZEX 7300, SKGC] was used as a resin for an outer layer (A), a second ethylene polymer [density: 0.935 g/cm3, melting point: 126° C., MI: 1.0 g/10 min (190° C., 2.16 kg), YUCLAIR FN800M, SKGC] was used as a resin for an intermediate layer (B), a third ethylene polymer [density: 0.885 g/cm3, melting point: 74° C., MI: 1.0 g/10 min (190° C., 2.16 kg), Supreme 891, SKGC] was used as a resin for an inner layer (C), and the thicknesses and the total thickness of the layers of the film were 20 μm/80 μm/20 μm (total 120 μm) in Example 1.

The physical properties of the obtained polyethylene film are shown in Table 2.

Comparative Example 2

A polyethylene film having a multi-layer structure was produced in the same manner as that of Example 1, except that a first ethylene polymer [density: 0.927 g/cm3, melting point: 124° C., melt index: 0.7 g/10 min (190° C., 2.16 kg), YUCLAIR FH809, SKGC] was used as a resin for an outer layer (A), a second ethylene polymer [density: 0.902 g/cm3, melting point: 100° C., MI: 1.0 g/10 min (190° C., 2.16 kg), Supreme 021S, SKGC] was used as a resin for an intermediate layer (B), a third ethylene polymer [density: 0.905 g/cm3, melting point: 102° C., MI: 1.0 g/10 min (190° C., 2.16 kg), Supreme 051S, SKGC] was used as a resin for an inner layer (C), and the thicknesses and the total thickness of the layers of the film were 30 μm/60 μm/30 μm (total 120 μm) in Example 1.

The physical properties of the obtained polyethylene film are shown in Table 2.

TABLE 2

|  | Example 1 | Example 2 | Example 3 | Comparative Example 1 | Comparative Example 2 |
| --- | --- | --- | --- | --- | --- |
| Outer layer (A) Density/melt index (Thickness) | 0.957/1.0 (30 μm) | 0.965/1.0 (12 μm) | 0.963/0.7 (16 μm) | 0.965/1.0 (20 μm) | 0.927/0.7 (30 μm) |

TABLE 2-continued

| | Example 1 | Example 2 | Example 3 | Comparative Example 1 | Comparative Example 2 |
|---|---|---|---|---|---|
| Intermediate layer (B) Density/melt index (Thickness) | 0.912/1.0 (60 μm) | 0.918/1.0 (96 μm) | 0.919/0.9 (63 μm) | 0.935/1.0 (80 μm) | 0.902/1.0 (60 μm) |
| Inner layer (C) Density/melt index (Thickness) | 0.885/1.0 (30 μm) | 0.885/1.0 (12 μm) | 0.863/1.0 (31 μm) | 0.885/1.0 (20 μm) | 0.905/1.0 (30 μm) |
| Inner layer melting point (° C.) | 74 | 74 | 45 | 74 | 102 |
| Difference in melting point between outer/inner layers (° C.) | 57 | 59 | 87 | 59 | 22 |
| Falling ball impact strength per unit thickness (g/μm) | 6.4 | 10.6 | 13.0 | 1.05 | 15.6 |
| Puncture strength per unit thickness (N/μm) | 0.31 | 0.28 | 0.30 | 0.42 | 0.18 |
| Tensile strength-MD (kg/cm2) | 393 | 424 | 420 | 351 | 320 |
| Low-temperature cracking strength in heat-sealed boundary area (J) | 1.67 | 1.64 | 1.87 | 0.97 | 1.95 |
| Low-temperature packaging drop evaluation | ○ | ◎ | ○ | ○ | X |
| Bag-making speed | High speed (90 ea/min) | High speed (90 ea/min) | High speed (100 ea/min) | High speed (90 ea/min) | Low speed (55 ea/min) |

Referring to Table 2, the polyethylene films having a multi-layer structure of Examples 1 to 3 satisfied all the physical properties in which the falling ball impact strength per unit thickness was 3.0 to 15.0 g/μm, the puncture strength per unit thickness was 0.2 to 0.4 N/μm, and the difference in melting point between the outer layer (A) and the inner layer (C) was 30 to 100° C. In addition, it was confirmed that the durability at a low temperature was significantly improved, such that the energy value indicating the cracking strength in the heat-sealed boundary area was 1.6 J or more, which was significantly high, significantly excellent results were exhibited in the ice pack drop evaluation, and the bag-making speed was implemented at a significantly high speed of 90 ea/min or more.

On the other hand, in the cases of Comparative Examples 1 and 2 in which one or more of the outer layer (A), the intermediate layer (B), and the inner layer (C) was out of the density range according to the present invention and the falling ball impact strength per unit thickness and the puncture strength per unit thickness did not satisfy all the ranges limited by the present invention, it was confirmed that the durability at a low temperature was significantly deteriorated in comparison to those of Examples 1 to 3, and as a result of the ice pack drop evaluation, defects such as cracking or tearing occurred easily. In particular, in the case of Comparative Example 1, it was confirmed that the energy value indicating the cracking strength in the heat-sealed boundary area was 0.97 J, which was significantly low, and thus, the heat-sealed boundary area was easily ruptured.

In addition, in the case of Comparative Example 2, it was confirmed that since the difference in melting point between the outer layer (A) and the inner layer (C) was 22° C., which was significantly small, the melting point of the inner layer (C) was 102° C., which was significantly high, the difference in melting point was out of the range limited by the present invention, the bag-making speed was 55 ea/min, which was significantly low, and thus, processability and productivity in the heat-sealing process were significantly deteriorated.

In addition, it was confirmed that in the case of the polyethylene film having a multi-layer structure according to the present invention, the tensile strength in a machine direction (MD) was also excellent in comparison to a laminated film formed of different materials according to the related art and Comparative Examples 1 and 2, and the polyethylene single material was used, such that the polyethylene film was easily recycled, the mechanical properties such as impact resistance were maintained or further improved, and thus, the use of the polyethylene film could be more expanded.

Hereinabove, although the present invention has been described by specific matters and limited embodiments, they have been provided only for assisting in the entire understanding of the present invention. Therefore, the present invention is not limited to the above embodiments. Various modifications and changes may be made by those skilled in the art to which the present invention pertains from this description.

Therefore, the spirit of the present invention should not be limited to these embodiments, but the claims and all modifications equal or equivalent to the claims are intended to fall within the scope and spirit of the present invention.

The invention claimed is:

1. A polyethylene film comprising a multi-layer structure, comprising:
    an outer layer (A) comprising a first ethylene polymer having a density $M_1$ of $0.935 \leq M_1 \leq 0.968$;
    an intermediate layer (B) comprising a second ethylene polymer having a density $M_2$ of $0.900 \leq M_2 \leq 0.920$; and
    an inner layer (C) comprising a third ethylene polymer having a density $M_3$ of $0.850 \leq M_3 \leq 0.885$,
    each density being measured according to ASTM D-792, and a unit of each density is $g/cm^3$,
    wherein the outer layer (A), the intermediate layer (B), and the inner layer (C) are sequentially laminated to form the polyethylene film comprising the multi-layer structure,
    wherein a falling ball impact strength per unit thickness of the polyethylene film comprising the multi-layer structure according to ASTM D 1709 is 3.0 to 15.0 g/μm, and a puncture strength per unit thickness of the polyethylene film comprising the multi-layer structure is 0.2 to 0.4 N/μm obtained by measuring a maximum strength when the film is ruptured by a pin having a diameter of 6.5 mm that punctures the film in an inner surface direction at a speed of 500 mm/min, and the falling ball impact strength and the puncture strength per unit thickness refer to numerical values obtained by dividing the falling ball impact strength and puncture strength values measured according to the above methods by a total thickness of the film, respectively, and wherein a difference in melting point between the outer layer (A) and the inner layer (C) is 55 to 90° C. and the melting point of the inner layer (C) is 80° C. or lower, and wherein a molecular weight distribution of the first ethylene polymer is 3 to 10, and a molecular weight distribution of the second ethylene polymer and the third ethylene polymer is 1 to 5.

2. The polyethylene film comprising a multi-layer structure of claim 1, wherein a ratio of thicknesses of the outer layer (A), the intermediate layer (B), and the inner layer (C) is 1:1 to 10:0.5 to 2.

3. The polyethylene film comprising a multi-layer structure of claim 1, wherein a heat-sealing initiation temperature that is a temperature when the inner layer (C) is heat-sealed according to ASTM F2029 and a seal strength measured according to ASTM F88 is 1,000 gf or more, is 40 to 120° C.

4. The polyethylene film comprising a multi-layer structure of claim 1, wherein a melt index of each of the first ethylene polymer, the second ethylene polymer, and the third ethylene polymer is 0.5 to 5 g/10 min when measured at 190° C. and 2.16 kg according to ASTM D 1238.

5. The polyethylene film comprising a multi-layer structure of claim 1, wherein the falling ball impact strength per unit thickness is 5.0 to 13.0 g/μm.

6. The polyethylene film comprising a multi-layer structure of claim 1, wherein the puncture strength per unit thickness is 0.25 to 0.35 N/μm.

7. The polyethylene film comprising a multi-layer structure of claim 1, wherein a total thickness of the film is 50 to 300 μm.

8. The polyethylene film comprising a multi-layer structure of claim 1, wherein the first ethylene polymer, the second ethylene polymer, and the third ethylene polymer are each an ethylene copolymer obtained by polymerizing ethylene and independently selected C3-C18 α-olefin comonomer(s).

9. The polyethylene film comprising a multi-layer structure of claim 8, wherein the α-olefin comonomer is selected from the group consisting of 1-propylene, 1-butene, 1-hexene, 1-heptene 1-octene, and mixtures thereof.

10. The polyethylene film comprising a multi-layer structure of claim 1, wherein any one of the first ethylene polymer, the second ethylene polymer, and the third ethylene polymer is polymerized in the presence of a single-site catalyst.

11. The polyethylene film comprising a multi-layer structure of claim 1, wherein a functional layer is laminated on the outer layer (A).

12. The polyethylene film comprising a multi-layer structure of claim 11, wherein the functional layer comprises at least one layer selected from the group consisting of a barrier coating layer, a top coating layer, a print layer, and combinations thereof.

13. A packaging material comprising the polyethylene film comprising a multi-layer structure of claim 1.

14. A molded article comprising the packaging material of claim 13.

15. The molded article of claim 14, wherein the molded article is selected from the group consisting of an ice pack, a frozen food packaging bag, a frozen food container, a refrigerated food packaging bag, a refrigerated food container, a shrink film, packaging film, a stretch wrap, and a bag.

* * * * *